United States Patent
Stanton et al.

(10) Patent No.: US 11,148,209 B2
(45) Date of Patent: Oct. 19, 2021

(54) POWER TOOL CHUCK

(71) Applicant: BLACK & DECKER INC., New Britain, CT (US)

(72) Inventors: Matthew Stanton, Rockville, MD (US); David P. Engvall, Stanley, NC (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 16/565,575

(22) Filed: Sep. 10, 2019

(65) Prior Publication Data

US 2020/0086396 A1  Mar. 19, 2020

Related U.S. Application Data

(60) Provisional application No. 62/732,029, filed on Sep. 17, 2018, provisional application No. 62/732,035, filed on Sep. 17, 2018, provisional application No. 62/732,222, filed on Sep. 17, 2018, provisional application No. 62/733,807, filed on Sep. 20, 2018, provisional application No. 62/747,357, filed on Oct. 18, 2018.

(51) Int. Cl.
   *B23B 31/12* (2006.01)
   *B23B 31/02* (2006.01)
   *B23B 31/173* (2006.01)

(52) U.S. Cl.
   CPC .......... *B23B 31/1253* (2013.01); *B23B 31/02* (2013.01); *B23B 31/1238* (2013.01); *B23B 31/16158* (2013.01); *B23B 2231/38* (2013.01)

(58) Field of Classification Search
   CPC ............... B23B 31/1238; B23B 31/02; B23B 31/16158; B23B 31/1253; B23B 31/16045; B23B 31/1612; B23B 2231/38; Y10T 279/17658; Y10T 279/17623; Y10T 279/17701; Y10T 279/17709; Y10T 279/17743; Y10T 279/17672; Y10T 279/1981; Y10T 279/17615; Y10T 279/17632; Y10T 279/17666; Y10T 279/17564; Y10T 279/17581; Y10S 279/902

See application file for complete search history.

(56) References Cited

U.S. PATENT DOCUMENTS

| | | |
|---|---|---|
| 206,320 A | 7/1878 | Hayden |
| 489,862 A | 1/1893 | Blessing |
| 565,584 A | 8/1896 | Wilkerson |
| 913,059 A | 2/1909 | Savage |

(Continued)

FOREIGN PATENT DOCUMENTS

| | | | |
|---|---|---|---|
| CN | 200957461 Y | * | 10/2007 |
| CN | 203371091 U | | 1/2014 |

(Continued)

*Primary Examiner* — Eric A. Gates
*Assistant Examiner* — Chwen-Wei Su
(74) *Attorney, Agent, or Firm* — Scott B. Markow

(57) ABSTRACT

A chuck including a chuck body that supports a plurality of jaws. An outer sleeve is axially fixed with respect to the chuck body. A nut is coupled to the outer sleeve, and the nut is movable axially and radially relative to the chuck body. The nut interacts with the jaws such that when the outer sleeve rotates, the nut moves axially and radially relative to the body.

20 Claims, 9 Drawing Sheets

(56) References Cited

U.S. PATENT DOCUMENTS

| | | | |
|---|---|---|---|
| 952,364 A | 3/1910 | Schultis | |
| 1,008,057 A | 11/1911 | Peck | |
| 1,076,710 A | 10/1913 | Schultis | |
| 1,432,225 A | 10/1922 | Wolnick et al. | |
| 1,750,023 A | 3/1930 | Prigan | |
| 1,837,392 A | 12/1931 | Anreasson | |
| 1,851,403 A | 3/1932 | Preston et al. | |
| 2,098,675 A | 11/1937 | Procunier | |
| 2,162,246 A | 6/1939 | Cote | |
| 2,272,185 A | 2/1942 | Chittenden | |
| 2,358,300 A | 9/1944 | Benjamin et al. | |
| 2,477,600 A | 8/1949 | Hammond | |
| 2,557,486 A | 6/1951 | Weiss | |
| 2,606,034 A | 8/1952 | Heldenbrand | |
| 2,778,651 A | 1/1957 | Benjamin et al. | |
| 2,855,210 A | 5/1959 | Sima | |
| 3,037,782 A | 6/1962 | Chittenden et al. | |
| 3,727,928 A | 4/1973 | Benjamin | |
| 3,737,170 A | 6/1973 | Wanner et al. | |
| 4,266,789 A | 5/1981 | Wahl et al. | |
| 4,491,445 A | 1/1985 | Hunger et al. | |
| 4,498,682 A | 2/1985 | Glore | |
| 4,508,180 A | 4/1985 | Klueber | |
| 4,536,109 A | 8/1985 | Hunger et al. | |
| 4,682,918 A | 7/1987 | Palm | |
| 4,726,719 A | 2/1988 | Mack | |
| 4,919,023 A | 4/1990 | Bloink | |
| 4,958,840 A | 9/1990 | Palm | |
| 4,968,191 A | 11/1990 | Palm | |
| 5,067,376 A | 11/1991 | Fossella | |
| 5,090,273 A | 2/1992 | Fossella | |
| 5,448,931 A | 9/1995 | Fossella et al. | |
| 5,531,549 A | 7/1996 | Fossella | |
| 5,577,743 A | 11/1996 | Kanaan et al. | |
| 5,820,134 A | 10/1998 | Subils Valls | |
| 6,196,554 B1 | 3/2001 | Gaddis et al. | |
| 6,241,259 B1 | 6/2001 | Gaddis et al. | |
| 6,488,287 B2 | 12/2002 | Gaddis et al. | |
| 6,648,341 B1 * | 11/2003 | Gaddis | B23B 31/1215 |
| | | | 279/123 |
| 6,726,222 B2 | 4/2004 | Roehm et al. | |
| 7,644,931 B2 | 1/2010 | Mack | |
| 7,699,566 B2 | 4/2010 | Nickel, Jr. et al. | |
| 7,722,300 B1 | 5/2010 | Corcoran | |
| 7,753,381 B2 | 7/2010 | Nickel, Jr. et al. | |
| 7,806,636 B2 | 10/2010 | Puzio | |
| 8,038,156 B2 | 10/2011 | Nickel, Jr. et al. | |
| 8,459,905 B2 | 6/2013 | Nickel, Jr. et al. | |
| 9,174,281 B2 | 11/2015 | Schenk | |
| 9,193,055 B2 | 11/2015 | Lim et al. | |
| 9,486,858 B2 | 11/2016 | Schenk et al. | |
| 9,643,258 B2 * | 5/2017 | Dedrickson | B23B 31/1253 |
| 2004/0007437 A1 | 1/2004 | Linzell | |
| 2006/0175770 A1 | 8/2006 | Linzell | |
| 2006/0232022 A1 | 10/2006 | Nickels, Jr. et al. | |
| 2010/0176562 A1 | 7/2010 | Linzell | |
| 2015/0209871 A1 | 7/2015 | Liu et al. | |
| 2016/0031072 A1 | 2/2016 | Lim et al. | |
| 2019/0111555 A1 * | 4/2019 | Abbott | B23B 31/123 |

FOREIGN PATENT DOCUMENTS

| | | | | |
|---|---|---|---|---|
| DE | 3540223 A1 | | 5/1987 | |
| DE | 3604927 A1 * | | 8/1987 | B23B 31/16158 |
| GB | 565584 | | 11/1944 | |
| WO | WO-2019178777 A1 * | | 9/2019 | B23B 31/1253 |
| WO | WO-2019178778 A1 * | | 9/2019 | B23B 31/123 |

* cited by examiner

POWER TOOL CHUCK

RELATED APPLICATIONS

This application claims priority, under 35 U.S.C. § 119(e) to U.S. Provisional Patent Application No. 62/732,029, filed Sep. 17, 2018, entitled "Power Tool Chuck"; U.S. Provisional Patent Application No. 62/732,035, filed Sep. 17, 2018, entitled "Power Tool Chuck"; U.S. Provisional Patent Application No. 62/732,222, filed Sep. 17, 2018, entitled "Chuck For Power Tool"; U.S. Provisional Patent Application No. 62/733,807, filed Sep. 20, 2018, entitled "Chuck For Power Tool"; and U.S. Provisional Patent Application No. 62/747,357, filed Oct. 18, 2018, entitled "Chuck for Power Tool". Each of the foregoing applications is hereby incorporated by reference.

TECHNICAL FIELD

This application relates to chucks, such as keyless chucks, for use with power tools (e.g., drills and screwdrivers).

BACKGROUND

Chucks, including keyless chucks, for retaining tool bits in power tools, such as drills and screwdrivers, are well known in the prior art. Existing chucks tend to have issues with insufficient holding force on tool bits. These chucks also add significant overall axial length to the power tool. It is desirable to have power tool chucks that overcome these deficiencies.

SUMMARY

In one aspect, a power tool chuck includes a chuck body extending along a chuck axis and couplable to an output spindle of a rotary power tool. A longitudinal bore is defined in the body along the axis for receiving a tool bit therein. A plurality of radial slots is defined in the body in communication with the longitudinal bore. A plurality of jaw assemblies is received in the body, each jaw assembly at least partially received in one of the plurality of radial slots and moveable to engage and removably retain the tool bit in the chuck body. A clamping ring is received over the chuck body and the jaw assemblies and rotatable relative to the chuck body and the jaw assemblies to engage and removably retrain the tool bit in the chuck body. The clamping ring and each jaw assembly together define a first clamping interface configured to cause the jaw assembly to clamp the tool bit a first clamping force up to a first maximum clamping force during a first phase of clamping, and a second clamping interface configured to cause the jaw assembly to clamp the tool bit at a second clamping force that is greater than the first maximum clamping force during a second phase of clamping.

Implementations of this aspect may include one or more of the following features.

The first clamping interface may be oriented at a first angle relative to the axis and the second clamping interface is oriented at a second angle relative to the axis that is less than the first angle. The first angle may be approximately 30° to 60° and the second angle may be approximately 1° to 15°.

Each jaw assembly may comprise a first jaw portion and a second jaw portion. The first clamping interface may be defined between the first jaw portion and the clamping ring, and the second clamping interface may be defined between the first jaw portion and the second jaw portion. The first clamping interface may be oriented at a first angle relative to the axis and the second clamping interface may be oriented at a second angle relative to the axis that is less than the first angle. The first angle may be approximately 30° to 60° and the second angle may be approximately 1° to 15°.

The first clamping interface may be defined between the first jaw portion and the second jaw portion, and the second clamping interface may be defined between the first jaw portion and the clamping ring. The first clamping interface may be oriented at a first angle relative to the axis and the second clamping interface may be oriented at a second angle relative to the axis that is less than the first angle. The first angle may be approximately 30° to 60° and the second angle may be approximately 1 to 15.

The clamping ring may be threadably connected to the chuck body. An outer sleeve may be received over the clamping ring so that the outer sleeve and clamping ring rotate together. Relative rotation between the clamping ring and the chuck body may cause the jaw assembly to clamp the tool bit at the first clamping force and the second clamping force. The relative rotation between the clamping ring and the chuck body may encompass holding one of the clamping ring and the chuck body rotationally stationary while rotating the other of the clamping ring and the chuck body. The relative rotation may encompass holding the clamping ring rotationally stationary by a user grasping the outer sleeve while the chuck body rotates by actuating a motor in the power tool. The relative rotation may encompass the outer sleeve being coupled to a lock mechanism that selectively locks the outer sleeve to a housing of the power tool to inhibit rotation of the outer sleeve and the clamping ring, while the chuck body rotates by actuating a motor in the power tool. The relative rotation may encompass rotating the outer sleeve to rotate the clamping ring, while the body is held substantially stationary by a spindle lock in the power tool.

The jaw assembly may be biased away from clamping the tool bit by at least one spring. The at least one spring may comprise a first spring biasing the jaw assembly away from the chuck body in a direction substantially transverse to the axis. The at least one spring may further comprise a second spring biasing the jaw assembly in a direction substantially parallel to the axis. The jaw assembly may comprise a first jaw portion that directly engages the tool bit and a second jaw portion that directly engages the first jaw portion and the clamping ring, wherein the first spring is disposed between the body and the second jaw portion and the second spring is disposed between the first jaw portion and the second jaw portion. The first spring may comprise a compression spring and the second spring may comprise a disc spring.

The clamping ring may comprise an inner ring threadably connected to the chuck body by a first thread and an outer ring received over and threadably connected to the inner ring by a second thread. The clamping ring may further comprise a detent biased by a detent spring and coupling the inner ring to the outer ring so that the inner ring and the outer ring rotate together as a unit when a force on the detent spring is less than or equal to a spring threshold value and the outer ring rotates relative to the inner ring when the force on the detent spring exceeds the spring threshold value. The force on the detent spring may exceed the spring threshold value approximately when the second clamping force exceeds the first maximum clamping force. The first thread may have a coarser thread pitch than does the second thread. The first thread may be configured to cause the inner clamping ring to impart the first clamping force to the jaw assembly and the second thread may be configured to cause the outer clamping ring to impart the second clamping force to the jaw assembly.

In another aspect, a power tool chuck includes a chuck body extending along a chuck axis and couplable to an output spindle of a rotary power tool. A longitudinal bore is defined in the body along the axis for receiving a tool bit therein. A plurality of radial slots is defined in the body in communication with the longitudinal bore. A plurality of jaw assemblies is received in the body, each jaw assembly at least partially received in one of the plurality of radial slots and moveable to engage and removably retain the tool bit in the chuck body. A clamping ring is received over the chuck body and the jaw assemblies and rotatable relative to the chuck body and the jaw assemblies to engage and removably retrain the tool bit in the chuck body. Each jaw assembly defines a first jaw portion and a second jaw portion moveable relative to the first jaw portion, and one of the first jaw portion and the second jaw portion is configured to cause the jaw assembly to clamp the tool bit at a first clamping force up to a first maximum clamping force during a first phase of clamping. The other of the first jaw portion and the second jaw portion is configured to cause the jaw assembly to clamp the tool bit at a second clamping force that is greater than the first maximum clamping force during a second phase of clamping.

Implementations of this aspect may include one or more of the following features. The jaw assembly may have a first clamping interface oriented at a first angle relative to the axis and the second clamping interface oriented at a second angle relative to the axis that is less than the first angle. The first jaw portion may directly engage the clamping ring and the second jaw portion, and the second jaw portion may directly engage the first jaw portion and the tool bit. The first clamping interface may be defined between the first jaw portion and the clamping ring and the second clamping interface may be defined between the second jaw portion and the first jaw portion. The first angle may be approximately 30° to 60° and the second angle may be approximately 1° to 15°. The first clamping interface may be defined between the first jaw portion and the second jaw portion and the second clamping interface may be defined between the first jaw portion and the clamping ring. The first angle may be approximately 30° to 60° and the second angle may be approximately 1° to 15°. The outer sleeve may be received over the clamping ring so that the outer sleeve and clamping ring rotate together. Relative rotation between the clamping ring and the chuck body may cause the jaw assembly to clamp the tool bit at the first force and the second force. The relative rotation between the clamping ring and the chuck body may encompass holding one of the clamping ring and the chuck body rotationally stationary while rotating the other of the clamping ring and the chuck body. The relative rotation may encompass holding the clamping ring rotationally stationary by a user grasping the outer sleeve while the chuck body rotates by actuating a motor in the power tool. The relative rotation may encompass the outer sleeve being coupled to a lock mechanism that selectively locks the outer sleeve to a housing of the power tool to inhibit rotation of the outer sleeve and the clamping ring, while the chuck body rotates by actuating a motor in the power tool. The relative rotation may encompass rotating the outer sleeve to rotate the clamping ring, while the body is held substantially stationary by a spindle lock in the power tool.

The jaw assembly may be biased away from clamping the tool bit by at least one spring. The at least one spring may comprise a first spring biasing the jaw assembly away from the chuck body in a direction substantially transverse to the axis. The at least one spring may further comprise a second spring biasing the jaw assembly in a direction substantially parallel to the axis. The first jaw portion may directly engage the clamping ring and the second jaw portion, the second jaw portion may directly engage the first jaw portion and the tool bit, and the first spring may be disposed between the body and the second jaw portion and the second spring may be disposed between the first jaw portion and the second jaw portion.

The clamping ring may comprise an inner ring threadably connected to the chuck body by a first thread and an outer ring received over and threadably connected to the inner ring by a second thread. The clamping ring may further comprise a spring biased detent coupling the inner ring to the outer ring so that the inner ring and the outer ring rotate together as a unit when a force on the spring is less than or equal to a spring threshold value and the outer ring rotates relative to the inner ring when the force on the spring exceeds the spring threshold value. The force on the spring may exceed the spring threshold value approximately when the second clamping force exceeds the first maximum clamping force. The first thread may have a coarser thread pitch than does the second thread. The first thread may be configured to cause the inner clamping ring to impart the first clamping force to the jaw assembly and the second thread may be configured to cause the outer clamping ring to impart the second clamping force to the jaw assembly.

In another aspect, a power tool chuck includes a chuck body extending along a chuck axis and couplable to an output spindle of a rotary power tool. A longitudinal bore is defined in the body along the axis for receiving a tool bit therein. A plurality of radial slots is defined in the body in communication with the longitudinal bore. A plurality of jaw assemblies is received in the body, each jaw assembly at least partially received in one of the plurality of radial slots and moveable to engage and removably retain the tool bit in the chuck body. A clamping ring is received over the chuck body and the jaw assemblies and rotatable relative to the chuck body and the jaw assemblies to engage and removably retrain the tool bit in the chuck body. The clamping ring comprises an inner ring threadably connected to the chuck body by a first thread and an outer ring received over and threadably connected to the inner ring by a second thread. The first thread is configured to cause the jaw assembly to clamp the tool bit a first clamping force up to a first maximum clamping force when the inner ring rotates relative to the chuck body during a first phase of clamping. The second thread is configured to cause the jaw assembly to clamp the tool bit at a second clamping force that is greater than the first maximum clamping force when the outer ring rotates relative to the inner ring and the chuck body during a second phase of clamping.

Implementations of this aspect may include one or more of the following features. The clamping ring may further comprise a detent biased by a detent spring to couple the inner ring to the outer ring so that the inner ring and the outer ring rotate together as a unit when a force on the spring is less than or equal to a spring threshold value and the outer ring rotates relative to the inner ring when the force on the spring exceeds the spring threshold value. The force on the spring may exceed the spring threshold value approximately when the second clamping force exceeds the clamp threshold value. The first thread may have a coarser thread pitch than does the second thread. The first thread may be configured to cause the inner clamping ring to impart the first clamping force to the jaw assembly and the second thread may be configured to cause the outer clamping ring to impart the second clamping force to the jaw assembly.

Each jaw assembly may define a first jaw portion and a second jaw portion moveable relative to the first jaw portion, the first jaw portion configured to cause the jaw assembly to clamp the tool bit at the first clamping force, and the second jaw portion configured to cause the jaw assembly to clamp the tool bit at the second clamping force. The inner ring and the outer ring may be configured to rotate in unison to cause the jaw assembly to clamp the tool bit at the first clamping force and the second ring may be configured to rotate relative to the first ring to cause the jaw assembly to clamp the tool bit at the second clamping force. The jaw assembly may have a first clamping interface at a first angle relative to the axis and a second clamping interface at a second angle relative to the axis that is less than the first angle. The second jaw portion may directly engage the tool bit and the first jaw portion, and the first jaw portion may directly engage the second jaw portion and the clamping ring. A first clamping interface may be defined between the first jaw portion and the second jaw portion and the second clamping interface may be defined between the first jaw portion and the clamping ring. The first clamping surface may be oriented at a first angle relative to the axis and the second clamping surface may be oriented at a second angle relative to the axis that is less than the first angle.

An outer sleeve may be received over the clamping ring so that the outer sleeve and clamping ring rotate together. The clamping ring may be threadably connected to the chuck body. Relative rotation between the clamping ring and the chuck body may cause the jaw assembly to clamp the tool bit at the first force and the second force. The relative rotation between the clamping ring and the chuck body may encompass holding one of the clamping ring and the chuck body rotationally stationary while rotating the other of the clamping ring and the chuck body. The relative rotation may encompass holding the clamping ring rotationally stationary by a user grasping the outer sleeve while the chuck body rotates by actuating a motor in the power tool. The relative rotation may encompass the outer sleeve being coupled to a lock mechanism that selectively locks the outer sleeve to a housing of the power tool to inhibit rotation of the outer sleeve and the clamping ring, while the chuck body rotates by actuating a motor in the power tool. The relative rotation may encompass rotating the outer sleeve to rotate the clamping ring, while the body is held substantially stationary by a spindle lock in the power tool. The jaw assembly may be biased away from clamping the tool bit by at least one spring. The at least one spring may comprise a first spring biasing the jaw assembly away from the chuck body in a direction substantially transverse to the axis.

In an aspect, a chuck for a power tool includes a chuck body extending along a chuck axis and couplable to an output spindle of a power tool. A longitudinal bore is defined in the body along the axis for receiving a tool bit therein. A plurality of jaws is received in the body and moveable radially but not axially, to engage and removably retain the tool bit in the chuck body. A sleeve is received over the body. A first gear is received in the body and rotatable by rotation of the sleeve or the output spindle. A second gear is received in the body, meshed with the first gear, and coupled to at least one of the plurality of jaws, the second gear configured to rotate and cause the at least one jaw to move radially, but not axially, independently of a chuck key, to engage the tool bit or disengage the tool bit upon rotation of the first gear.

Implementations of this aspect may include one or more of the following features. The first gear may comprise a first bevel gear and the second gear may comprise a second bevel gear. Each of the plurality jaws may be received in a radial opening that is communication with the longitudinal bore. Each of the at least one jaw may be threadably engaged with the second gear so that rotation of the second gear causes radial movement of the at least one jaw. The first gear may be rotatable by rotation of the sleeve or the output spindle independent of a chuck key. The second gear may include a plurality of second gears, with each of the second gears coupled to one of the plurality of jaws. The first gear may comprise a ring shaped bevel gear, and each of the second gears may comprise a bevel gear meshed with the ring shaped bevel gear. The sleeve may be moveable axially between a chuck mode position and a drill mode position. When the sleeve is in the chuck mode position, rotation of the output spindle may cause the first gear to rotate. In the sleeve is in the chuck mode position, the sleeve may rotationally lock the body to a housing of the power tool. When the sleeve is in the drill mode position, rotation of the output spindle may cause the body to rotate and drive a tool bit retained in the longitudinal bore. A brake may be coupled to the sleeve. When the sleeve is in the drill mode position, the brake may rotationally couple the first gear to the body so that the body, the first gear, and the output spindle rotate together. When the sleeve is in the chuck mode position, the brake may decouple the first gear from the body to enable the output spindle and first gear to rotate relative to the body. When the sleeve is in the drill mode position, the sleeve may be rotatable relative to a housing of a power tool to change a clutch setting of the power tool. The power tool housing may include an electronic clutch and the sleeve may be rotatable to change a clutch setting of the electronic clutch when the sleeve is in the drill mode position.

In another aspect, a chuck for a power tool includes a chuck body extending along a chuck axis and couplable to an output spindle of a power tool. A longitudinal bore is defined in the body along the axis for receiving a tool bit therein. A plurality of jaws is received in the body and moveable to engage and removably retain the tool bit in the chuck body. A sleeve is received over the body. A first ring shaped bevel gear is received in the body and rotatable by rotation of the output spindle or the sleeve. A plurality of second bevel gears is received in the body and meshed with the first gear. Each of the second bevel gears is coupled to one of the plurality of jaws. The second gears are configured to rotate and cause the jaws to engage the tool bit or disengage the tool bit upon rotation of the first gear.

Implementations of this aspect may include one or more of the following features. The second gears may be spaced circumferentially around the longitudinal bore. Each of the jaws may be received in a radial opening that is communication with the longitudinal bore. Each of the jaws may be threadably engaged with one of the second gears so that rotation of the second gear causes radial movement of the jaw. The first gear may be rotatable by rotation of the sleeve or the output spindle independent of a chuck key. The sleeve may be moveable axially between a chuck mode position and a drill mode position. When the sleeve is in the chuck mode position, rotation of the output spindle may cause the first gear to rotate. When the sleeve is in the chuck mode position, the sleeve may rotationally lock the body to a housing of the power tool. When the sleeve is in the drill mode position, rotation of the output spindle may cause the body to rotate and drive a tool bit retained in the longitudinal bore. A brake may be coupled to the sleeve. When the sleeve is in the drill mode position, the brake may rotationally couple the first gear to the body so that the body, the first gear, and the output spindle rotate together. When the sleeve is in the chuck mode position, the brake may decouple the first gear from the body to enable the output spindle and first gear to rotate relative to the body. When the sleeve is in the drill mode position, the sleeve may be rotatable relative to a housing of a power tool to change a clutch setting of the power tool. The power tool housing may include an electronic clutch. The sleeve may be rotatable to change a clutch setting of the electronic clutch when the sleeve is in the drill mode position.

In another aspect, a power tool includes a tool housing, a motor disposed in the housing, an output spindle drivingly coupled to the motor and extending along a longitudinal axis, and a controller received in the housing and configured to control power delivery to the motor. An electronic clutch is in communication with the controller and configured to sense a tool operating parameter that correlates to an output torque of the output spindle. The electronic clutch is configured to cause the controller to interrupt or reduce power to the motor when the operating parameter indicates that the output torque exceeds a threshold value. A chuck is coupled to the output spindle. The chuck includes a body extending along the longitudinal axis. A longitudinal bore is defined in the body along the longitudinal axis for receiving a tool bit therein. A plurality of jaws is received in the body and moveable to engage or disengage the tool bit received in the bore. A is sleeve received over the body and is moveable axially between a first position in which the sleeve is configured to enable the jaws to be moved to engage or disengage the tool bit, and a second position in which the sleeve is rotatable to change a setting of the electronic clutch.

Implementations of this aspect may include one or more of the following features. The electronic clutch may include a printed circuit board disposed at least partially around the output spindle. In the second position, the sleeve may engage a wiper to change a position of the wiper along the printed circuit board to change the clutch setting. The drill housing may include a plurality of recesses. In the second position, the sleeve may be coupled to a detent that successively engages one or more of recesses as the sleeve is rotated to provide tactile feedback of the clutch setting. The sleeve may have indicia to indicate the clutch setting. In the first position, the sleeve may fix the chuck body to the tool housing so that operation of the motor causes the jaws to engage or disengage the tool bit.

In another aspect, a chuck constructed in accordance to one example of the present teachings can include a chuck body that supports a plurality of jaws. An outer sleeve is axially fixed with respect to the chuck body. A nut is coupled to the outer sleeve, the nut being movable axially and radially relative to the chuck body. The nut interacts with the jaws such that when the outer sleeve rotates, the nut moves axially and radially relative to the body.

Implementations of this aspect may include one or more of the following features. When the nut moves axially and radially relative to the chuck body, the jaws may move towards or away from one another. The chuck may have a front end at which the jaws extend from the chuck and are configured to hold a bit. The jaws may move away from one another when the nut moves axially toward the front end. The chuck may have a rear end opposite the front end. The jaws may move towards one another when the nut moves axially toward the rear end. The nut may include internal threads. The jaws may include external threads that mesh with the internal threads on the nut.

In another aspect, a power tool constructed in accordance to one example of the present teachings can include a housing, a motor and a chuck. The chuck is configured to hold an accessory. The chuck is selectively driven by the motor. The chuck includes a chuck body; a plurality of jaws disposed at least partially in the chuck body; a chuck sleeve that is axially fixed with respect to the chuck body, and is selectively rotatable with respect to the chuck body; and a nut coupled to the outer sleeve, the nut being movable axially and radially relative to the chuck body. The nut interacts with the jaws such that when that outer sleeve rotates, the nut moves axially and radially relative to the body.

Implementations of this aspect may include one or more of the following features. When the nut moves axially and radially relative to the body, the jaws may move towards or away from one another. The chuck may have a front end at which the jaws extend from the chuck and are configured to hold a bit. The jaws may move away from one another when the nut moves axially toward the front end. The chuck may have a rear end opposite the front end. The jaws may move towards one another when the nut moves axially toward the rear end. The nut may include internal threads. The jaws may include external threads that mesh with the internal threads on the nut.

In another aspect, a chuck constructed in accordance to one example of the present teachings can include a chuck body; a plurality of jaws, the plurality of jaws configured to hold a bit; an outer sleeve, the outer sleeve being axially fixed relative to the chuck body, the outer sleeve also being selectively rotatable with respect to the chuck body; and a nut coupled to the outer sleeve, wherein the nut is located internally of the outer sleeve and is movable axially and radially relative to the chuck body. The nut may include a nut threaded portion on an internal surface of the nut. The jaws may include a jaws threaded portion on an external portion of the jaws. The nut threaded portion may be engaged with the jaws threaded portion. When the outer sleeve rotates, the nut may move axially and radially relative to the body.

Implementations of this aspect may include one or more of the following features. When the nut moves axially and radially relative to the body, the jaws may move towards or away from one another. The chuck may have a front end at which the jaws extend from the chuck and are configured to hold a bit. The jaws may move away from one another when the nut moves axially toward the front end. The chuck may have a rear end opposite the front end. The jaws may move towards one another when the nut moves axially toward the rear end. The chuck may further include a lifter which pushes the jaws away from one another. The jaws may be axially fixed relative to the chuck body. The jaws may be axially fixed relative to the outer sleeve. The nut may have a frustoconical shape.

In another aspect, a chuck constructed in accordance with one example of the present teachings can include a chuck. The chuck includes a chuck body that supports a plurality of jaws. The chuck also includes an outer sleeve is axially fixed with respect to the chuck body and selectively rotatable with respect to the chuck body. The chuck further includes a cam core having a plurality of ramped inner surfaces. The jaws have outer surfaces in contact with the ramped inner surfaces. When the cam core rotates relative to the jaws, the ramped inner surfaces of the cam core push the jaws towards one another or away from one another. The chuck has a front at which the plurality of jaws are configured to hold a bit and a rear, opposite the front. The cam core may move axially rearwardly when the plurality of jaws are tightened around the bit.

Implementations of this aspect may include one or more of the following features. The cam core may have an outer circumferential surface. There may be a slot in the outer circumferential surface. The chuck may further include a connector which selectively transmits force from the outer sleeve to the cam core. The connector may have a first end engaged with the outer sleeve and a second end engaged with the slot. The slot may have a first end and a second end. The second end may be closer to the rear of the chuck than the first end is to the rear of the chuck. The cam core may further include detents biased radially outwardly. The outer sleeve may further include detent recesses which selectively engage the detents.

In another aspect, a power tool constructed in accordance with one example of the present teachings may include a power tool with a chuck. The power tool includes a housing, a motor disposed in the housing and a chuck configured to hold an accessory. The chuck is selectively driven by the motor. The chuck includes a chuck body that supports a plurality of jaws, an outer sleeve that is axially fixed with respect to the chuck body and is selectively rotatable with respect to the chuck body. The chuck also includes a cam core having a plurality of ramped inner surfaces. The jaws have outer surfaces in contact with the ramped inner surfaces. When the cam core rotates relative to the jaws, the ramped inner surfaces of the cam core push the jaws towards one another or away from one another. The chuck has a front at which the plurality of jaws are configured to hold a bit. The chuck has a rear, opposite the front. The cam core moves axially rearwardly when the plurality of jaws are tightened around the bit.

Implementations of this aspect may include one or more of the following features. The cam core may have an outer circumferential surface. There may be a slot in the outer circumferential surface. The chuck may further include a connector which selectively transmits force from the outer sleeve to the cam core. The connector may have a first end engaged with the outer sleeve and a second end engaged with the slot. The slot may have a first end and a second end. The second end may be closer to the rear of the chuck than the first end is to the rear of the chuck. The cam core may also include detents biased radially outwardly. The outer sleeve may further include detent recesses which selectively engage the detents.

In another aspect, a chuck constructed in accordance with one example of the present teachings can include a chuck. The chuck includes a plurality of jaws, a chuck sleeve and a cam core. Each of the plurality of jaws may include a clamping surface configured to engage a bit and each of the plurality of jaws also including an outer surface. The chuck sleeve is selectively rotatable with respect to the plurality of jaws. The cam core has a plurality of ramped surfaces. The chuck has a front end at which the bit is inserted. The chuck has a rear end, opposite the front end, at which the chuck is operatively engaged with a motor of a power tool. Totation of the chuck sleeve in a first direction causes the jaws to move from an open position towards one another to a closed position in which the bit is engaged and held by the jaws. The cam core moves towards the rear end of the chuck when the jaws are tightened on the bit.

Implementations of this aspect may include one or more of the following features. The cam core may be connected to the chuck sleeve by at least one connector. The connector may urge the cam core towards the rear end of the chuck when the jaws are tightened on the bit. The cam core may include a radial outer surface. The cam core may include a slot in the radial outer surface. The slot may include a first end and a second end. The first end of the slot may be closer to the front end of the chuck than the second end of the slot is to the front end of the chuck. The chuck may further include a connector connecting the chuck sleeve and the cam core. An end of the connector may be engaged with and movable along the slot. The cam core may also include detents biased radially outwardly. The chuck sleeve may also include detent recesses which selectively engage the detents. The chuck may be part of a power tool. The power tool may be a powered drill. The powered drill may be powered by a battery pack. The chuck may include three jaws. Each of the three jaws may have an outer surface which is inclined. The detent recesses may include ramped surfaces configured to depress a detent plunger. The cam core may have three ramped surfaces.

Advantages may include one or more of the following. The chucks of this application have improved holding force due, in part, to the mechanical advantage achieved with the bevel gears. In addition, the bevel gears, which cause the jaws to move radially but not axially, reduces the axial length of the chucks, which reduces the overall length of the power tool. In addition, the chucks of this application integrate the clutch setting with the chuck sleeve, further reducing the number of components and overall length of the power tool. The chucks may have improved clamping force due to clamping the tool bit in a first phase with a first clamping force up to a first maximum clamping force and in a second phase with a second clamping force that exceeds the first maximum clamping force. This may be achieved, in part, by having a clamping ring and a jaw assembly together defining first and second clamping interfaces at different angles to the longitudinal axis. In addition, because the jaw assembly movement is primarily in the radial direction, this reduces the axial length of the chuck, which reduces the overall length of the power tool. These and other advantages and features will be apparent from the description and drawings.

DETAILED DESCRIPTION

Figure 1:
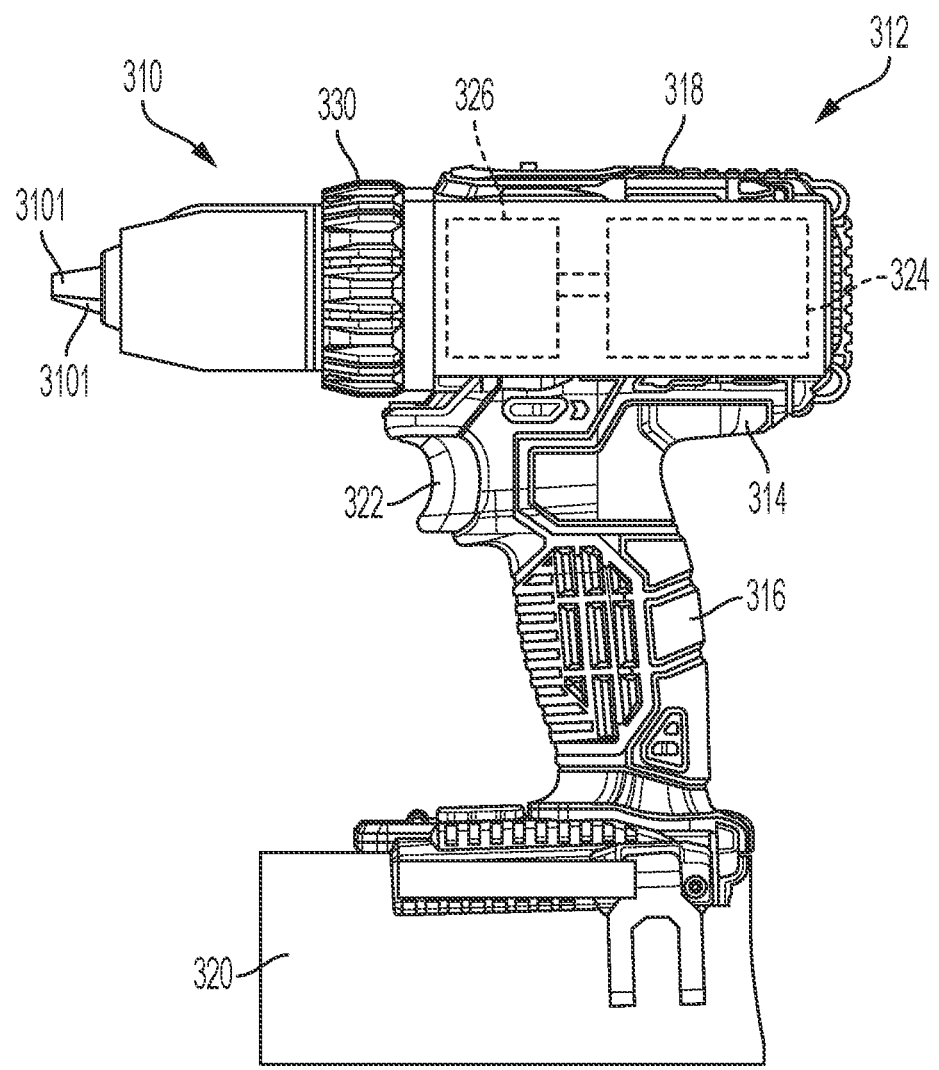
FIG. 1 is a side view of an exemplary embodiment of a drill that incorporates a chuck according to an exemplary embodiment of the present application.

With initial reference to FIG. 1, a drill chuck constructed in accordance to one example of the present teachings is shown and generally identified at reference numeral 310. The drill chuck 310 is shown operatively associated with an exemplary drill 312 that can have a housing 314 including a handle portion 316 and a body portion 318. The exemplary drill 312 can include a battery pack 320 that can be releasably attached to the handle portion 316. It will be appreciated however that while the exemplary drill 312 is shown in FIG. 1 as a cordless battery powered drill, the principles of the drill chuck 310 disclosed herein can also be applicable to other drill configurations, such as corded drills.

A trigger 322 can be provided on the handle portion 316 for selectively providing electric current from the battery pack 320 to a motor 324 provided within the body portion 318 of the housing 314. A transmission device 326 can be drivingly connected to the motor 324. The drill chuck 310 can be driven by the motor 324 through the transmission device 326. The drill 312 may also include a clutch 330. Those skilled in the art will appreciate that other device may be incorporated into the drill 312, such as a hammer drill mechanism or other features that can be utilized in combination with the drill chuck 310 without departing from the scope of the present disclosure.

Figure 2:
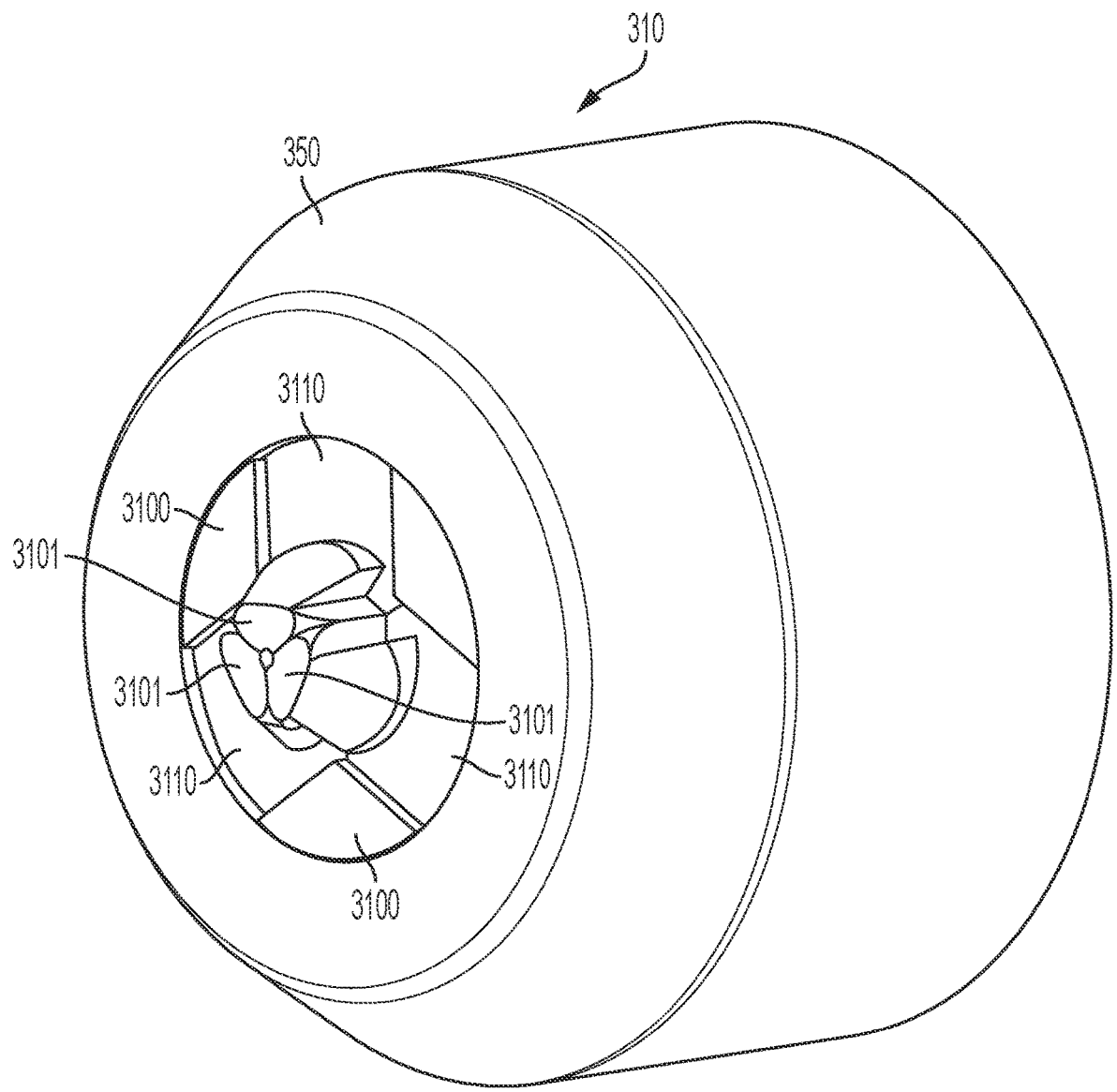
FIG. 2 is a front perspective view of the exemplary embodiment of the chuck of FIG. 1.

The chuck 310 is shown in greater detail in FIGS. 2-10. As shown in FIG. 2, the chuck 310 includes a chuck sleeve 350 and a chuck body 3100. Three jaws 3101 project out of the front of the chuck body 3100. Rotating the chuck sleeve 350 relative to the chuck body 3100 opens the jaws 3101 by spreading them apart from one another or closes the jaws 3101 so that they move towards each other and can hold a bit. Rotating the chuck sleeve 350 in a first direction causes the jaws 3101 to open and rotating the chuck sleeve 350 in a second direction, opposite the first, causes the jaws 3101 to close.

Figure 3:
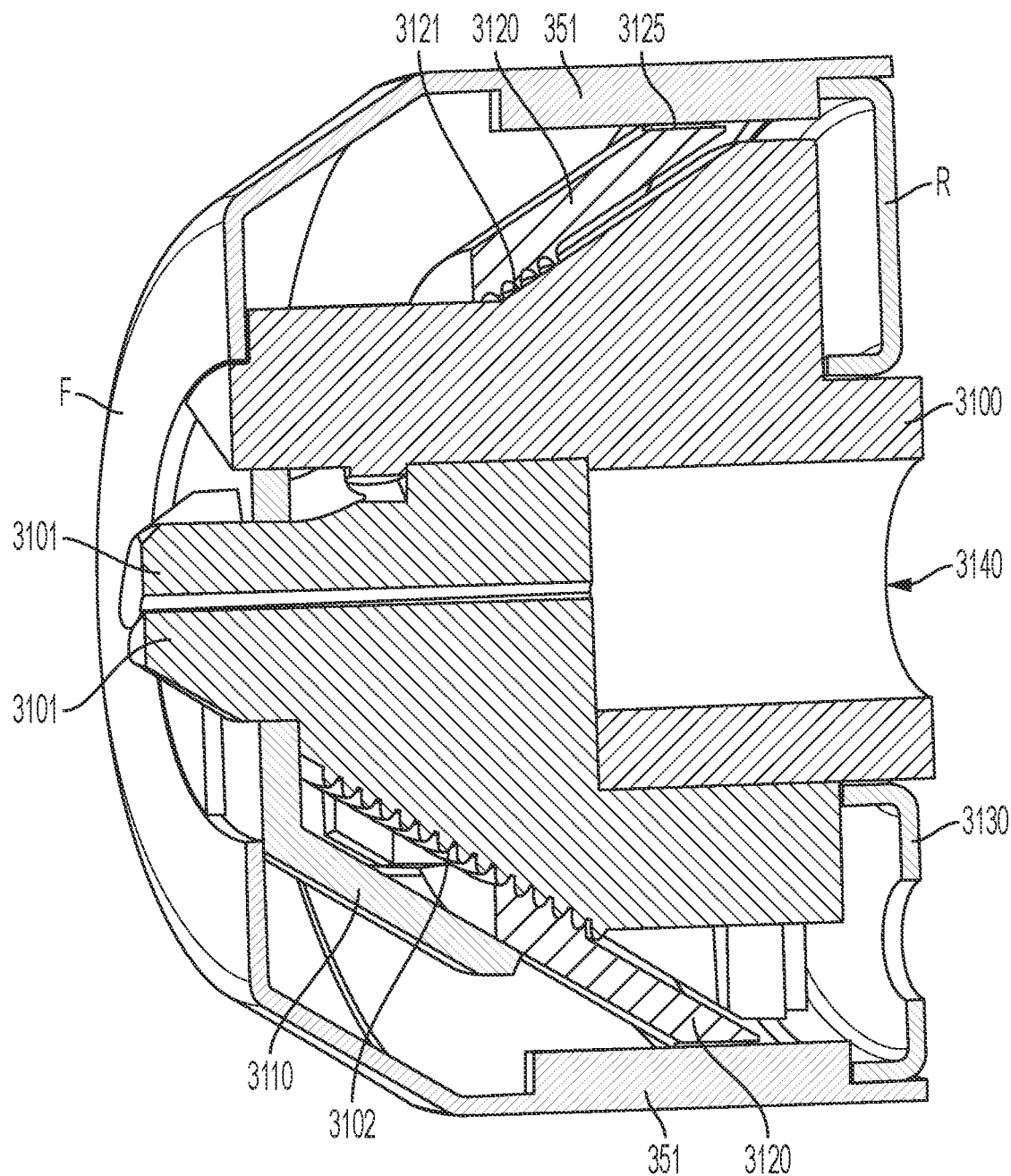
FIG. 3 is a cut-away side view of the exemplary embodiment of the chuck of FIG. 1.

A cross-sectional view of the chuck 310 is shown in FIG. 3. As shown in FIG. 3, the chuck 310 includes a front F a rear R. The jaws 3101 extend at the front F of the chuck 310 and the rear R faces the remainder of the drill 312.

As shown in FIG. 3, the internals of the chuck 310 includes a nut 3120. In the exemplary embodiment, the nut 3120 is torsionally coupled to the sleeve 350, as will be described in further detail below. As also shown in FIG. 3, the chuck 310 includes a rear plate 3130 and a bore hole 3140. The rear plate 3130 forms a back surface for the chuck 310. The chuck 310 is connected to the other parts of the drill 312 at the bore hole 3140, and is operatively connected to the motor 324 through the bore hole 3140. The bore hole 3140 may be threaded to promote connection to the rest of the drill 312, or the chuck 310 may be connected by other means. For example, the bore hole 3140 may be used to effect a frictional or interference fit.

The nut 3120 is frustoconical in shape and includes threads 3121 at its forward end. The threads 3121 are on the inside of nut 3120 and interact with threads 3102 on the outside of the jaws 3101. The chuck 310 also includes three lifters 3110, as will explained in further detail below. The lifters 3110 opening the jaws 3101. The exemplary embodiment includes three lifters 3110.

Due to their torsional connection, when the outer sleeve 350 is rotated, it rotates the nut 3120. The nut rotates and translates due to the ramped threads 3102 and 3121 on the jaws and the nuts, respectively. As the nut 3120 travels axially rearward (towards the drill 312 and the rear plate 3130), the nut 3120 pushes on the jaws 3101, and the jaws 3101 move towards one another in order to close. In this manner, the jaws 3101 can hold a bit (not shown) therebetween.

As the nut 3120 travels axially forwardly, towards the front F of the chuck 310, the lifter 3110 is pushed forwardly. The lifter 3110 interacts with the jaws 3101 in order to push the jaws 3101 away from one another in order to open the jaws 3101. Opening the jaws 3101 allows a bit to be removed or a new bit to be placed between the jaws 3101.

As will be appreciated, the jaws 3101 move only radially inwardly towards a rotational axis A (FIG. 3) of the chuck 310. The jaws 3101 do not move axially forwardly towards the front F of the chuck 310 or rearwardly towards the rear R of the chuck 310. Rather, the nut 3120 moves axially forwardly and rearwardly.

The chuck has a central longitudinal axis A. The jaws 3101 and the chuck 310 generally are centered around axis A. Additionally, the chuck 310 rotates about the axis A when driven by the motor 324. Axis A is also the rotational axis of the chuck sleeve 350 and the nut 3120 when they move relative to the chuck body 3100.

Further explanation of the closing of the jaws 3101 will be explained with reference to FIG. 3, As mentioned above, FIG. 3 is a cross sectional view of the exemplary embodiment of chuck 310. The cross sectional view cuts through the threaded portion 3102 of the jaw 3101 at the bottom of FIG. 3. As shown there, the threads 3102 mesh with the threads 3121 on the nut 3120. As discussed above, the jaws are axially fixed such that they do not move forward or rearward. Conversely, the nut 3120 is able to move axially forward and rearwardly. The nut 3120 is shown in its furthermost rearward position in FIG. 3. In this position, the jaws 3101 are fully closed.

When the chuck sleeve 350 is rotated in a first direction, the nut 3120 rotates with it. This causes the nut 3120 to also move axially forward. As the nut 3120 moves axially forward, the outer surface of the nut 3120 contacts an inner surface of the lifters 3110. Owing to its frustoconical shape, when the nut 3120 moves forward, a wider portion of the nut 3120 contacts the lifters 3110 and pushes the lifters radially outwardly.

Figure 5:
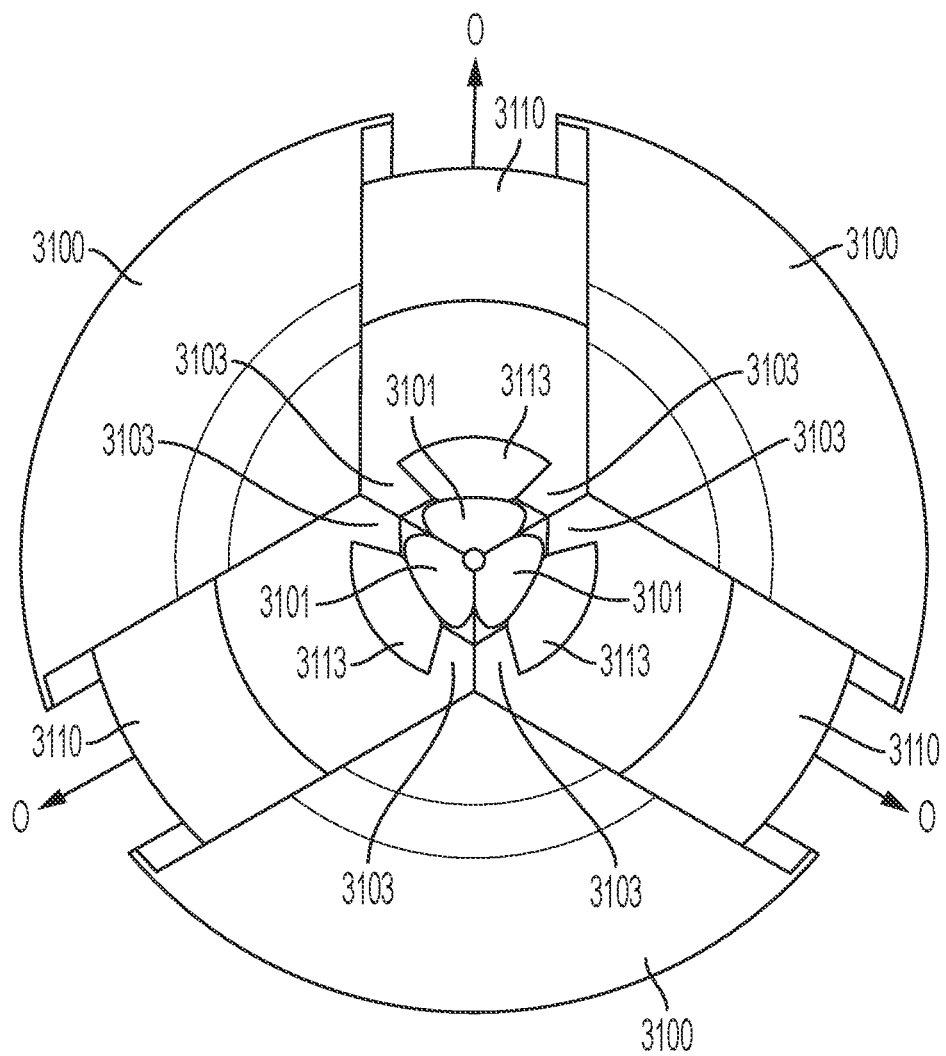
FIG. 5 is a front view of the exemplary embodiment of the chuck of FIG. 1 with the chuck sleeve removed.

As best shown in FIG. 5, the lifters 3110 have keyed portions 3113 and the jaws 3101 have a corresponding keyed portion 3103. The keyed portion 3103 of the jaws 3101 fits into the keyed portions 3113 of the lifters 3110, such that when the lifters move outwardly in the direction O, the keyed portions 3113 of the lifters 3110 pull on the keyed portions 3103 of the jaws 3101 in order to pull the jaws 3101 away from one another. In this way, the chuck jaws 3101 can be opened.

Figure 4:
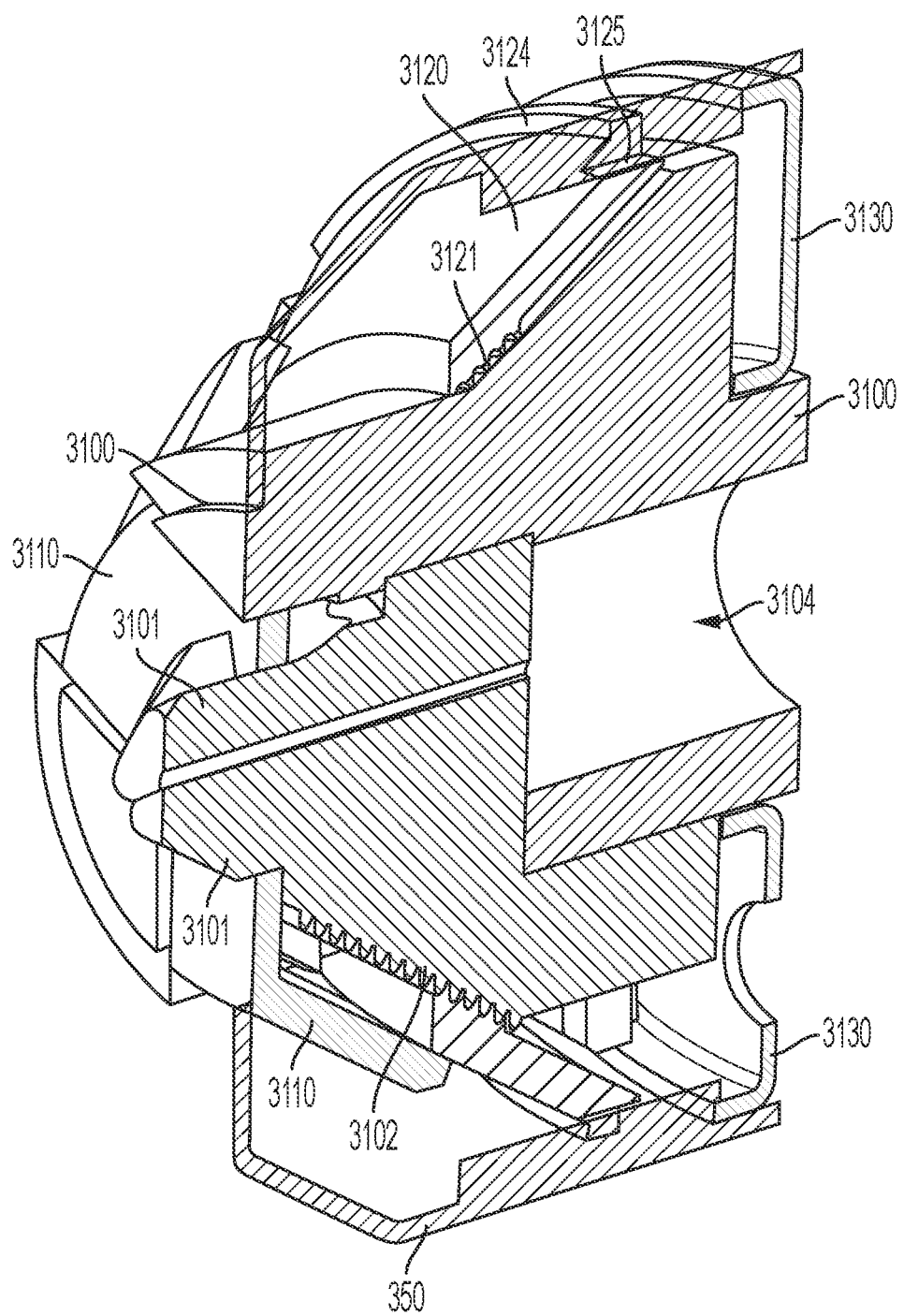
FIG. 4 is a cut-away perspective view of the exemplary embodiment of the chuck of FIG. 1 with the chuck sleeve removed.

When the chuck sleeve 350 is rotated in a second direction, the nut 3120 rotates with it to close the jaws 3101. As shown in FIGS. 3 and 4 an outer surface of the jaws 3101 with the threads 3102 slopes outwardly in the rearward direction. As the nut 3120 moves from a forward position shown in FIG. 10 towards the rearward position shown in FIG. 8, the nut 3120 interacts with an increasingly wide and outward portion of the jaws 3101. This causes the nut 3120 to push the jaws 3101 inwardly. For example, as shown in FIG. 8, the nut 3120 has pushed against the jaws 3101 such that they are fully closed.

Figure 8:
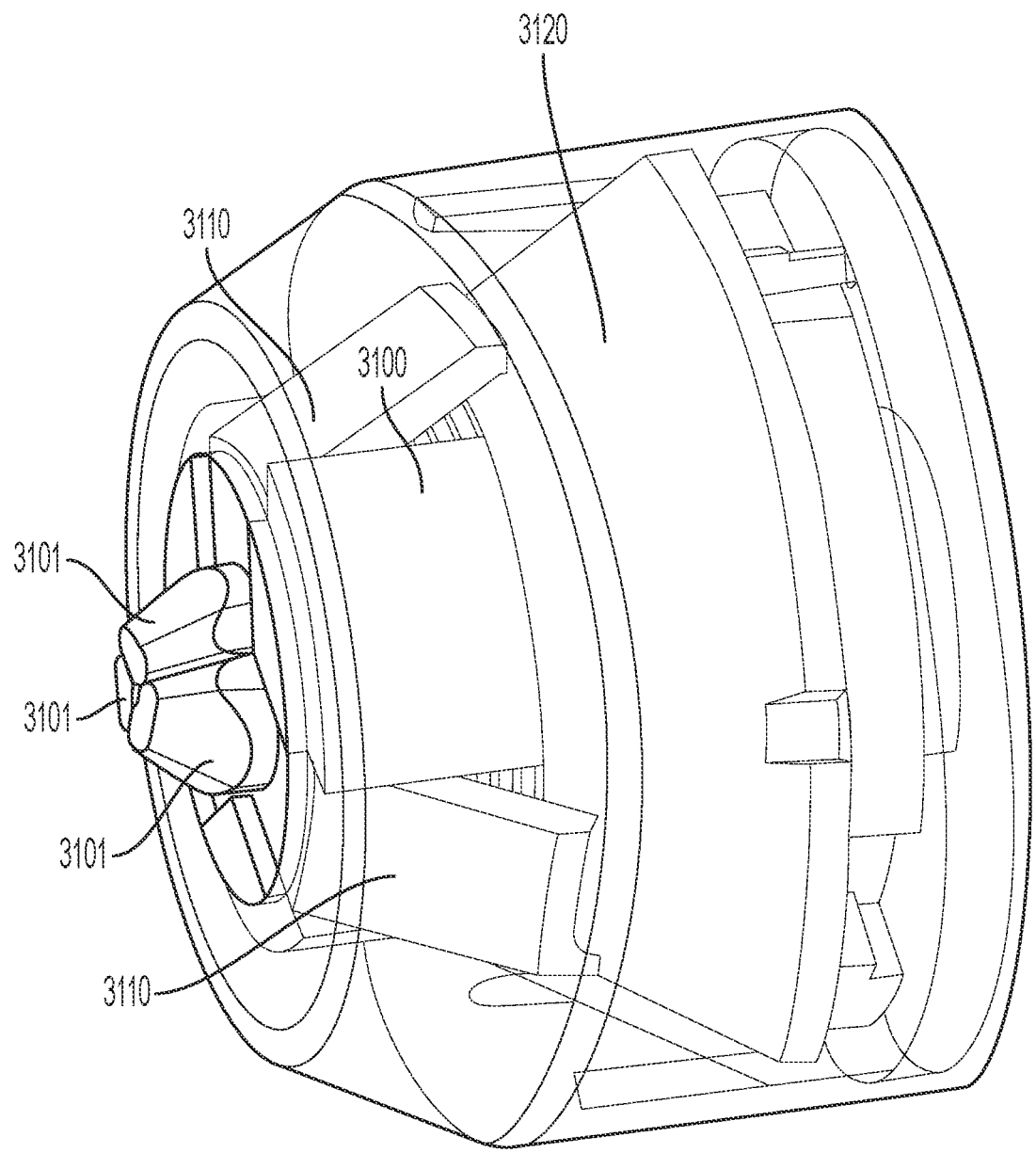
FIG. 8 is a partially translucent perspective view of the exemplary embodiment of the chuck of FIG. 1 with the jaws in a closed position.
Figure 9:
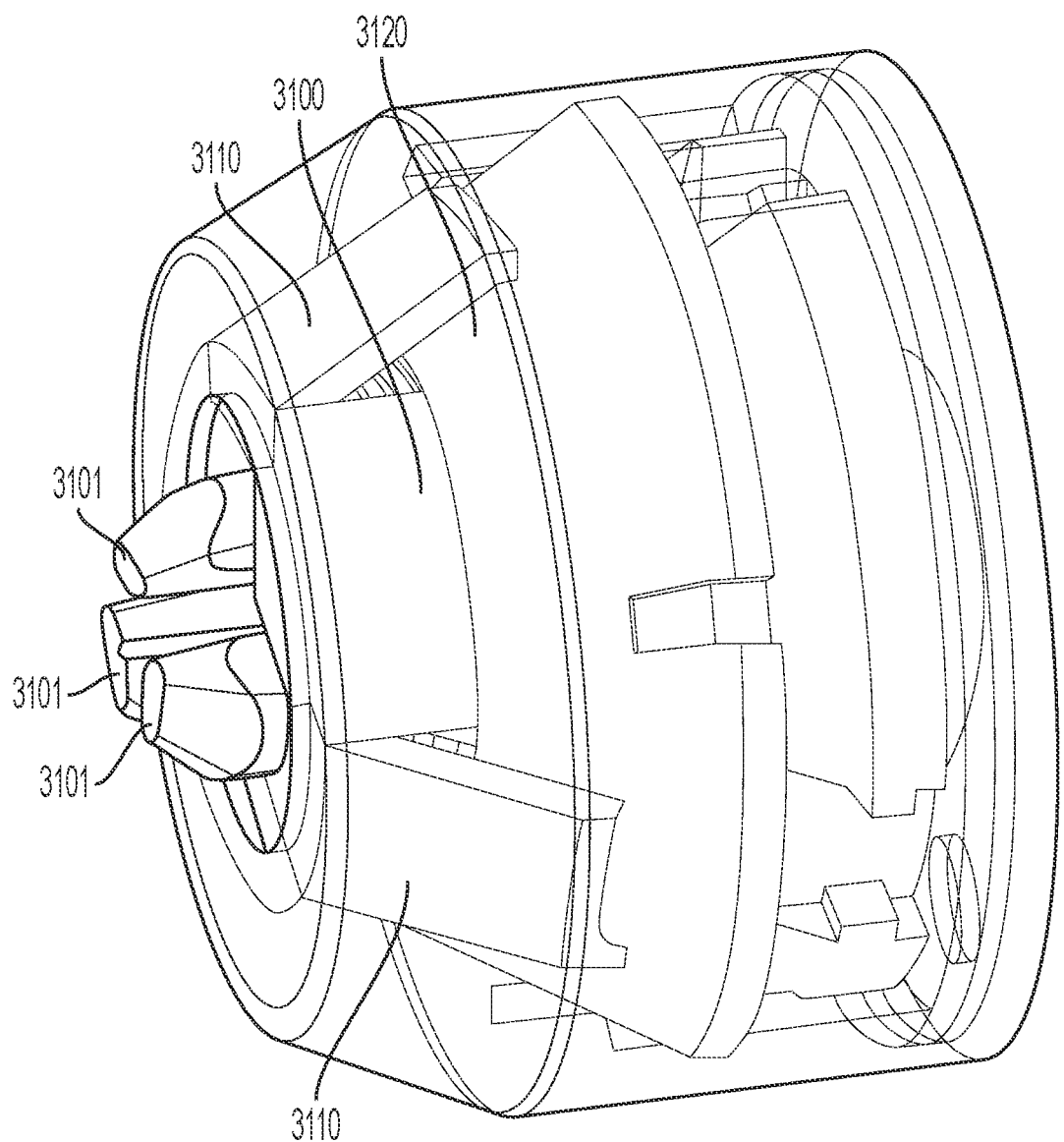
FIG. 9 is a partially translucent perspective view of the exemplary embodiment of the chuck of FIG. 1 with the jaws in an intermediate position.
Figure 10:
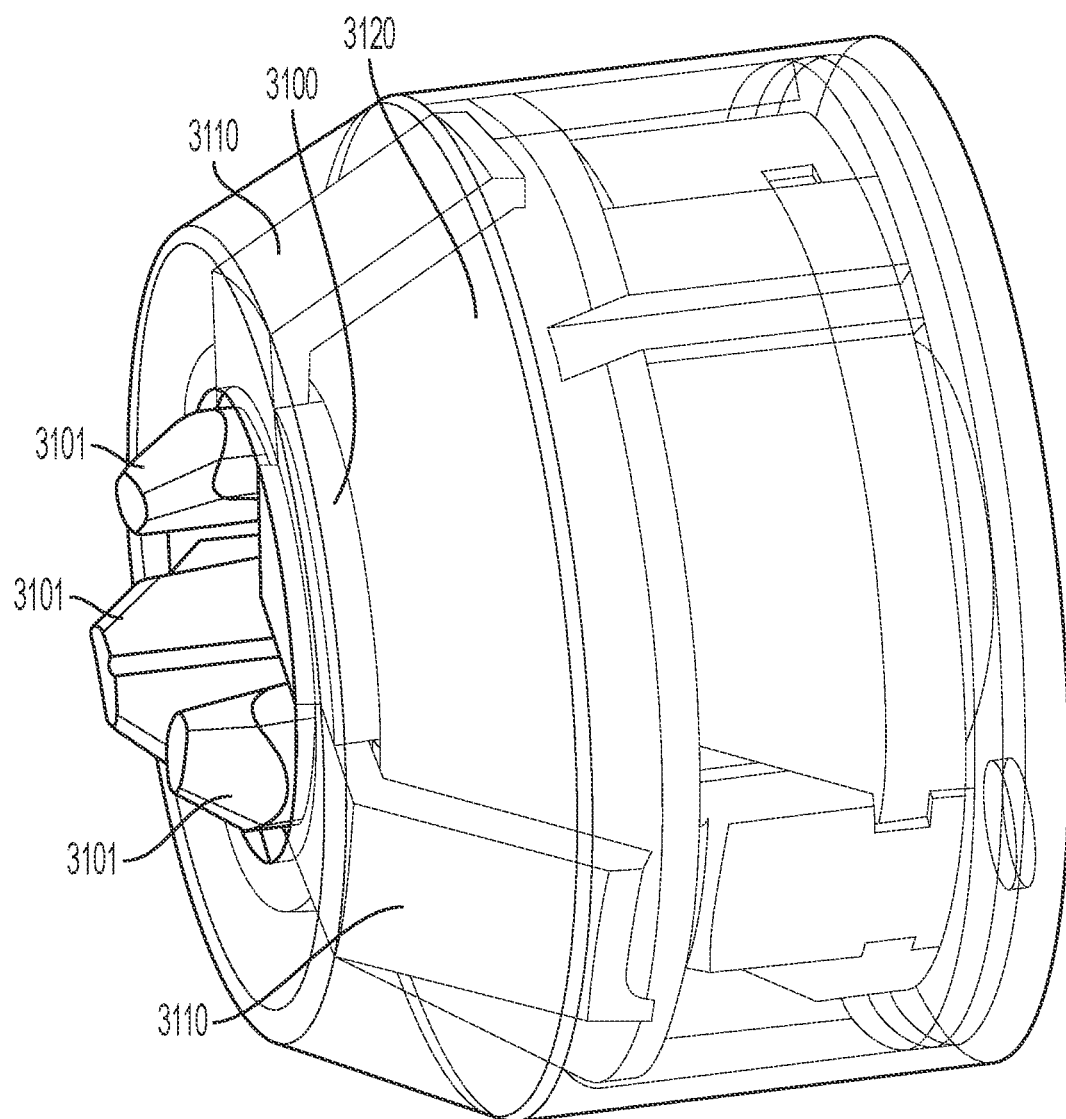
FIG. 10 is a a partially translucent perspective view of the exemplary embodiment of the chuck of FIG. 1 with the jaws in a fully open position.

FIGS. 8-10 are perspective views of the chuck with the sleeve 350 translucent and the jaws 3101 at various positions. FIG. 8 illustrates the jaws 3101 in a fully closed position. FIG. 9 illustrates the jaws 3101 in a partially open position. FIG. 10 illustrates the jaws 3101 in a fully open position. As will be appreciated, the jaws 3101 do not necessarily need to be moved to the fully open position in order to insert a bit. Similarly, the jaws 3101 do not have to be in a fully closed position in order to hold a bit.

Figure 7:
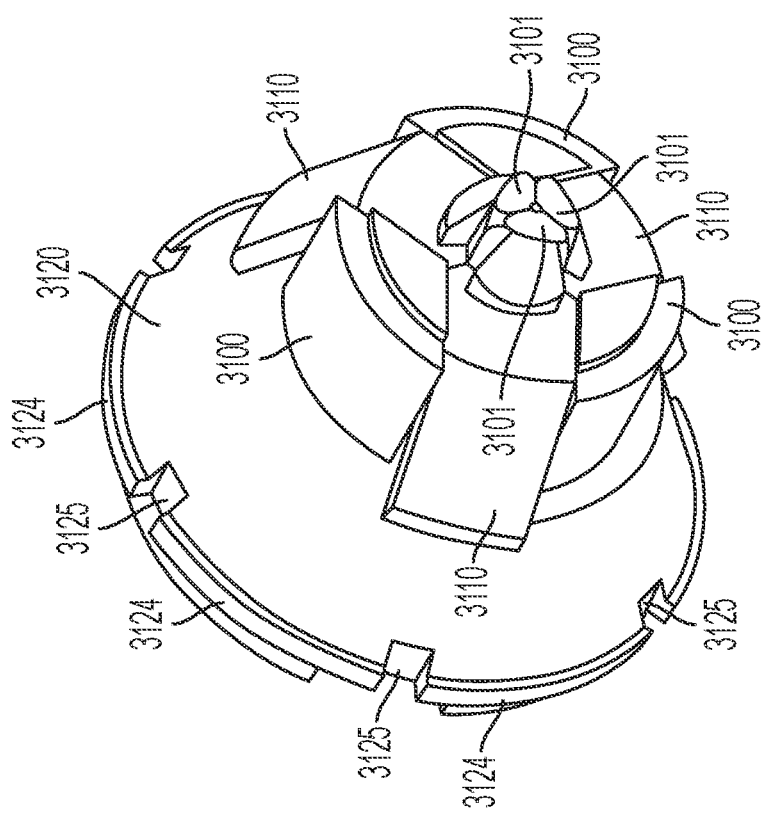
FIG. 7 is a front perspective view of the exemplary embodiment of the chuck of FIG. 1 with the chuck sleeve removed.
Figure 6:
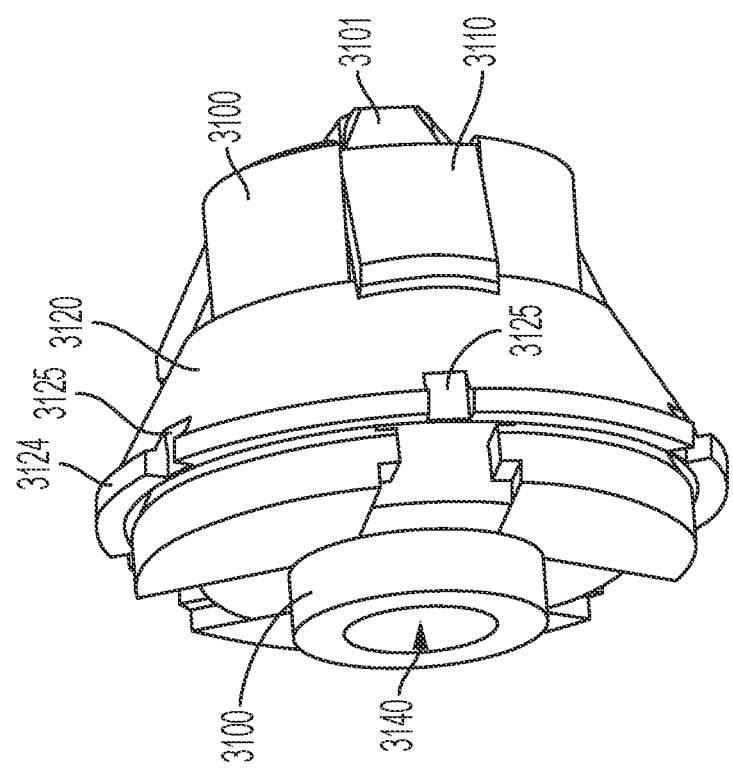
FIG. 6 is a side perspective view of the exemplary embodiment of the chuck of FIG. 1 with the chuck sleeve removed.

FIGS. 6 and 7 illustrate the chuck 310 with the chuck sleeve (outer sleeve) 350 and the end plate 3130 removed. As shown in FIGS. 6 and 7, the nut 3120 includes a projection 3124. The nut 3120 also includes a slot 3125. The slot 3125 interacts with a coupling projection 351, as shown in FIG. 3. The coupling projection 351 hits the projection 3124 at either side of the slot 3125 to move the nut 3120 rotationally when the chuck sleeve 350 is rotated. Additionally, as the nut 3120 may move forward relative to the chuck sleeve 350 from the position shown in FIG. 3, the slot 3125 may slide forward on the coupling projection 351. In the exemplary embodiment of the chuck 350, there are a plurality of slots 3125 and a corresponding plurality of coupling projections 351. In the case of the exemplary embodiment, there are six slots 3125 and six coupling projections 351.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. Numerous modifications may be made to the exemplary implementations described above. These and other implementations are within the scope of this patent application.

What is claimed is:

1. A chuck comprising:
a chuck body that supports a plurality of jaws that are moveable radially but not axially relative to the body;
an outer sleeve that is axially fixed with respect to the chuck body; and
a nut coupled to the outer sleeve, the nut being movable axially and rotationally relative to the chuck body;
wherein the nut interacts with the jaws such that when the outer sleeve rotates, the nut moves axially and rotationally relative to the body and the jaws move radially but not axially relative to the body.

2. The chuck of claim 1, wherein when the nut moves axially and rotationally relative to the chuck body, the jaws move towards or away from one another.

3. The chuck of claim 2, wherein the chuck has a front end at which the jaws are configured to hold a bit; and
wherein the jaws move away from one another when the nut moves axially toward the front end.

4. The chuck of claim 3, wherein the chuck has a rear end opposite the front end; and
wherein the jaws move towards one another when the nut moves axially toward the rear end.

5. The chuck of claim 1, wherein the nut includes internal threads.

6. The chuck of claim 5, wherein the jaws include external threads that mesh with the internal threads on the nut.

7. The chuck of claim 1, further comprising a lifter configured to push the jaws away from one another when the nut is rotated in a first direction.

8. A power tool comprising;
a housing;
a motor disposed in the housing; and
a chuck configured to hold an accessory, the chuck being selectively driven by the motor;
wherein the chuck comprises:
a chuck body;
a plurality of jaws disposed at least partially in the chuck body and moveable radially but not axially relative to the body;

an outer sleeve that is axially fixed with respect to the chuck body, and selectively rotatable with respect to the chuck body; and a nut coupled to the outer sleeve, the nut being movable axially and rotationally relative to the chuck body;

wherein when the outer sleeve rotates, the nut moves axially and rotationally relative to the body and the jaws move radially but not axially relative to the body.

9. The power tool of claim 8, wherein when the nut moves axially and rotationally relative to the body, the jaws move towards or away from one another.

10. The power tool of claim 9, wherein the chuck has a front end at which the jaws are configured to hold a bit; and wherein the jaws move away from one another when the nut moves axially toward the front end.

11. The power tool of claim 10, wherein the chuck has a rear end opposite the front end; and wherein the jaws move towards one another when the nut moves axially toward the rear end.

12. The power tool of claim 8, wherein the nut includes internal threads.

13. The power tool of claim 12, wherein the jaws include external threads that mesh with the internal threads on the nut.

14. The power tool of claim 8, wherein the chuck further comprises a lifter configured to push the jaws away from one another when the nut is rotated in a first direction.

15. A chuck comprising:
a chuck body having a front end and a rear end;
a plurality of jaws, the plurality of jaws configured to hold a bit;

an outer sleeve, the outer sleeve being axially fixed relative to the chuck body, the outer sleeve also being selectively rotatable with respect to the chuck body; and a nut coupled to the outer sleeve, wherein the nut is located internally of the outer sleeve and is movable axially and rotationally relative to the chuck body;

wherein the nut includes a nut threaded portion on a surface of the nut;

wherein the jaws include a jaws threaded portion on a portion of the jaws;

wherein the nut threaded portion are engaged with the jaws threaded portion; and wherein when the outer sleeve rotates in a first direction, the nut moves axially toward the rear end and rotationally relative to the body and the jaws move toward one another.

16. The chuck of claim 15, wherein when the outer sleeve rotates in a second direction opposite the first direction, the jaws move away from one another and the nut moves axially toward the front end.

17. The chuck of claim 16, further comprising a lifter which pushes the jaws away from one another.

18. The chuck of claim 15, wherein the jaws are axially fixed relative to the chuck body.

19. The chuck of claim 15, wherein the jaws are axially fixed relative to the outer sleeve.

20. The chuck of claim 15, wherein the nut has a frusto-conical shape.

* * * * *